United States Patent [19]
Kummer et al.

[11] 3,748,895
[45] July 31, 1973

[54] PULSE ULTRASOUND THICKNESS MEASURING SYSTEM HAVING INTERROGATION CONTROL

[75] Inventors: Jr. Kummer, Mount Prospect, Ill.; Ronald A. Straw, Brookfield, Conn.

[73] Assignee: Magnaflux Corporation, Chicago, Ill.

[22] Filed: June 1, 1971

[21] Appl. No.: 148,427

[52] U.S. Cl. .................................................. 73/67.9
[51] Int. Cl. .................................................. G01n 29/04
[58] Field of Search ..................................... 73/67.9

[56] References Cited
UNITED STATES PATENTS

| | | | |
|---|---|---|---|
| 3,280,622 | 10/1966 | Carlin | 73/67.9 |
| 3,570,279 | 3/1971 | Davies | 73/67.9 |
| 3,575,042 | 4/1971 | Lovelace | 73/67.9 X |

*Primary Examiner*—Richard C. Queisser
*Assistant Examiner*—Arthur E. Korkosz
*Attorney*—Hill, Sherman, Meroni, Gross & Simpson

[57] ABSTRACT

Pulse ultrasound thickness measuring system including a bistable circuit triggered to a set condition by an interface signal and to a reset condition by a back reflection received signal, the duration of the set condition of the bistable circuit being measured. The back reflection received signals are applied through gate mean controlled by a variable delay circuit in a manner to perform an interrogation function and to determine the order of the received signal which trigger the bistable circuit, to reliably and accurately determine the thickness a part. The variable delay mean may be operated manually or may be operated automatically and in conjunction with memory and subtraction means, to obtain an automatic read-out of the thickness.

9 Claims, 6 Drawing Figures

INVENTORS
GEORGE L. KUMMER, JR.
RONALD A. STRAW

BY Hill, Sherman, Meroni, Gross & Simpson

ATTORNEYS

PULSE ULTRASOUND THICKNESS MEASURING SYSTEM HAVING INTERROGATION CONTROL

This invention relates to a pulse ultrasound thickness measuring system and more particularly to a system having an interrogation control arrangement which permits highly reliable and accurate measurement of thickness even with parts which are relatively thin.

Pulse ultrasound thickness measuring systems generally include a transducer for periodically transmitting bursts of ultrasonic energy into a front surface of a part and receiver means operative to develop an interface signal corresponding to the transmission of the energy into the part and back reflection received signals. Thickness is measured by measuring the time interval between the interface signal and the first back reflection signal.

Such systems generally operate quite satisfactorily except in the case of thinner parts. The invention is based in part upon the discovery that the indications obtained are sometimes unreliable, especially in the case of thinner parts. It has further been found that the lack of reliability is caused by two factors. First, multiple reflections are generally produced with thinner parts and corresponding received signals are produced, including "first order" received signals corresponding to the first reflections received at the front surface after the initial transmission of a burst into the front surface, and second and higher order received signals from reflections back from the front surface to the back surface and back again. The second factor is that the interface signal is generally of quite high amplitude and duration and with thin parts, the first and sometimes even the second or higher order received signals merge with the interface signal. As a result, the reading obtained may be two or three times as large as the acutal thickness of the part.

This invention was evolved, based upon the discovery of such factors, and with the general object of providing a system with which reliable and accurate measurement of the thickness might be obtained, especially with thinner parts.

According to this invention, a variable delay circuit is provided for operating gate means connected between receiver means and a circuit means, such as a bistable circuit, arranged to be triggered in response to received signals. By progressively increasing the delay and the time of opening of the gate means following the transmission of bursts into the part, the order of the received signals can be accurately determined. For example, if the initial reading with no delay is doubled when the delay is increased to a certain value, it is established that the initial reading was due to the first order received signal. If, however, the reading is increased only 50 percent, it is established that the initial reading was actually obtained from the second order received signals. Thus, it is possible to insure an accurate determination of the thickness of the part.

In one preferred embodiment of the invention, the delay is manually increased which permits the use of relatively simple circuitry.

In another preferred embodiment the delay is automatically increased and with memory and subtraction circuitry, an automatic read-out of the actual thickness is obtained.

Important specific features of the invention relate to the arrangement of logic and other circuitry to obtain highly accurate and reliable results without undue complexity.

The invention contemplates other objects, features and advantages which will become more fully apparent from the following detailed description taken in conjunction with the accompanying drawings which illustrate preferred embodiments and in which.

Figure 1:
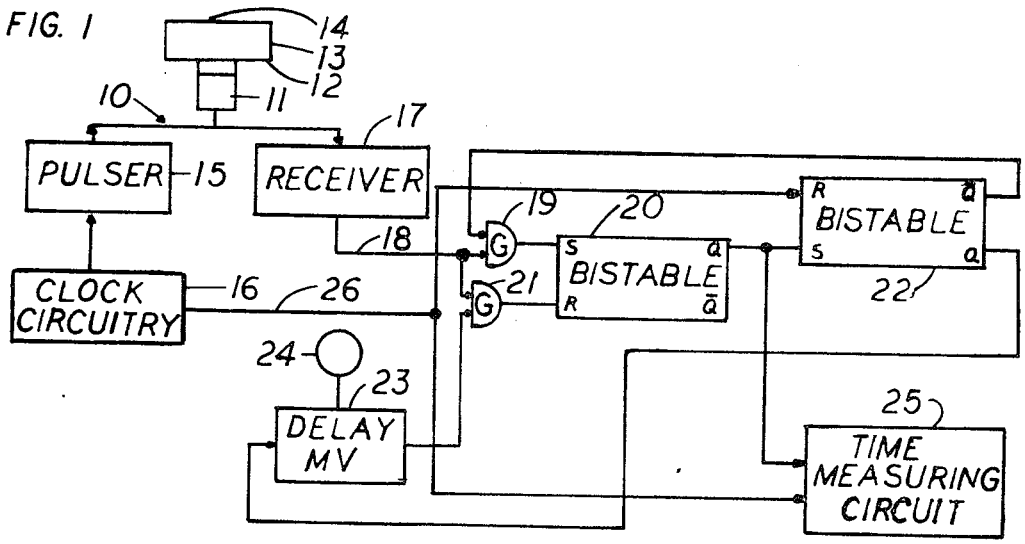
FIG. 1 is a schematic diagram of a pulse ultrasound thickness measuring system according to the principles of the invention.

Reference numeral 10 generally designates one preferred form of ultrasonic thickness measuring system constructed in accordance with the principles of this invention. The system 10 comprises a transducer 11 which may, as illustrated, be placed in direct contact with a front surface 12 of part 13 having a back surface 14. A pulser 15 is periodically operated by signals applied from clock circuitry 16 to apply electrical pulses to the transducer 11 and to cause transmission of bursts of ultrasonic energy into the front surface 12. Such bursts are reflected back from the back surface 14 to the front surface 12 to cause the transducer 11 to produce first order received signals. A certain portion of the energy is reflected back from the front surface 12 to the back surface 14 to be reflected back again to the front surface 12 and to produce second order received signals of significant amplitude. In most cases, and especially with thinner parts, third and higher order received signals are produced. Such signals are amplified by a receiver 17 to produce amplified signals on a line 18, referred to as the "video" line. Line 18 is connected to one input of a gate circuit 19 having an output connected to a "set" input of a bistable circuit 20. Line 18 is also connected to one input of a gate circuit 21 having an output connected to a "reset" input of the bistable circuit 20. A "Q" output of the bistable circuit 20 is connected to a set input of a second bistable circuit 22. A "Q̄" output of the bistable circuit 22 is connected to a second input of the gate 19. A "Q" output of the bistable circuit 22 is connected to the input of a delay multivibrator 23 having an output connected to a second input of the gate 21. The delay produced by multivibrator 23 is manually controllable by means of a control 24, as diagrammatically illustrated. Control 24 may, for example, control the value of a resistance in a RC timing circuit of the multivibrator 23.

The "Q" output of the bistable circuit 20 is additionally connected to a time measuring circuit 25. Reset inputs of the bistable circuit 22 and the time measuring circuit 25 are connected through a line 26 to the clock circuitry 16.

In operation, when the electrical pulse is applied from the pulser 15 to the transducer 11 an interface signal is produced on the video line 18 which is applied through gate 19 to the set input of the bistable circuit 20, which is then placed in a set condition, producing an output signal at the "Q" output which is applied to the set input of the bistable circuit 22 to also place circuit 22 in the set condition. From the "Q̄" output of the bistable circuit 22, the gate 19 is closed to prohibit further signals on the video line 18 from being applied to the set input of the bistable circuit 20.

The bistable circuit 22, from the "Q" output thereof, also initiates operation of the delay multivibrator 23 and after the delay period, the gate 21 passes the next video signal to the reset input of bistable 20.

Time measuring circuit 25 measures the length of time in which the bistable circuit 20 is in its set condition. Before the next operation of the pulser 15, a reset signal is applied from the clock circuitry 16 through line 26 to reset inputs of the bistable 22 and the time measuring circuit 25.

Figure 2:
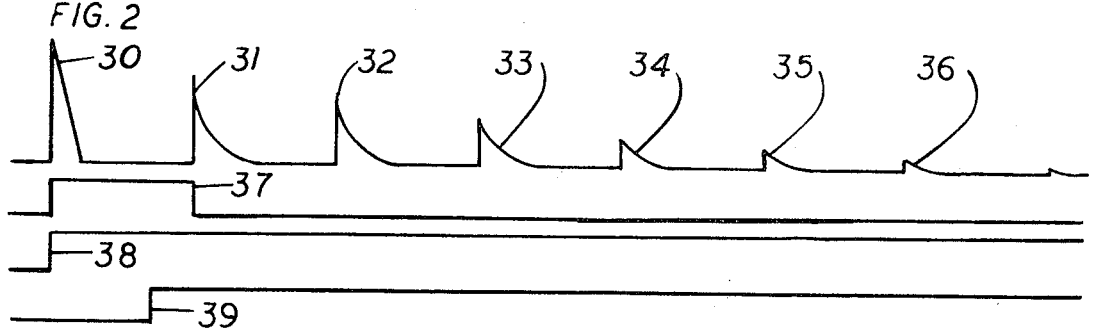
FIG. 2, 3, 4 and 5 shows wave forms produced at various points during various conditions of operation.

FIG. 2 shows the wave forms associated with conventional operation. There is a large interface signal indicated by reference numeral 30, followed by a series of back reflections 31–36. Bistable circuit 20 is set by the interface signal 30 and is reset by the first order received signal 31 to produce an output pulse designated by reference numeral 37 having a duration proportional to the thickness of the part, which is measured by the circuit 25. Reference numeral 38 designates the wave form at the "Q" output of the bistable 22 which goes "high" when the bistable 20 is set, and initiates operation of the delay circuit 23, the output of which goes "high" after a certain time delay, the wave form at the output of the delay multivibrator 23 being designated by reference numeral 39 in FIG. 2. The delay as illustrated in FIG. 2 is less than the time to the first order recieved signal and hence does not interfere with the conventional operation.

Figure 3:
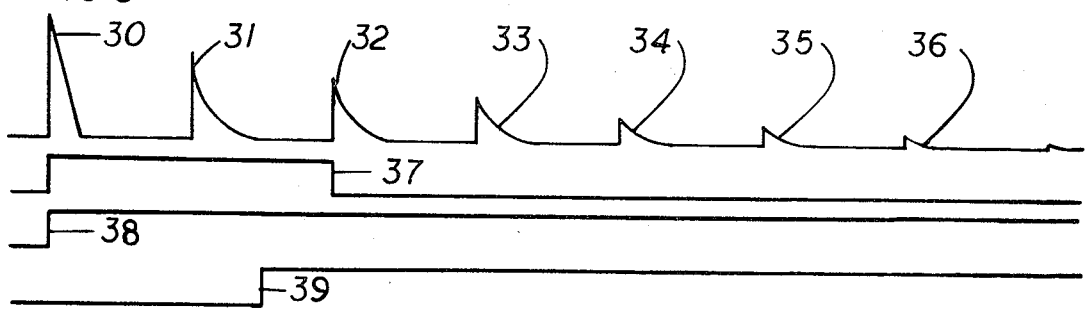

FIG. 3 shows the wave forms when the same video signals are received but with the delay increased to determine whether the original output of bistable circuit 20 corresponds to the duration from the interface signal to the first back reflection signal. The interface signal sets bistable 20 in this case, but the delay is increased so that the first order received signal 31, which reset bistable circuit 20 in the operation depicted in FIG. 2, is now inhibited. As shown in FIG. 3 the second back reflection or second order received signal will reset the bistable circuit 20. With such being the case, the output of bistable circuit 20 will have a duration approximately twice what it was before the delay was increased and such indicates that the original reading was proper.

Figure 4:
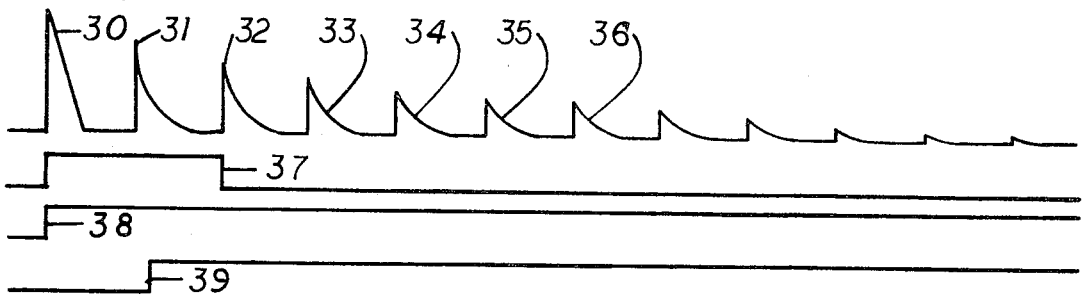

FIG. 4 shows the wave forms obtained when reflection signals are close together enough to give an improper reading. The bistable circuit 20 is set by the interface signal 30 but the gate 21 is not enabled by the delay multivibrator 23 until after the first back reflection signal. In this case, the bistable 20 is reset by the second back reflection 32 and the output of bistable 20 is twice what it should be to correspond to the thickness of the part.

Figure 5:
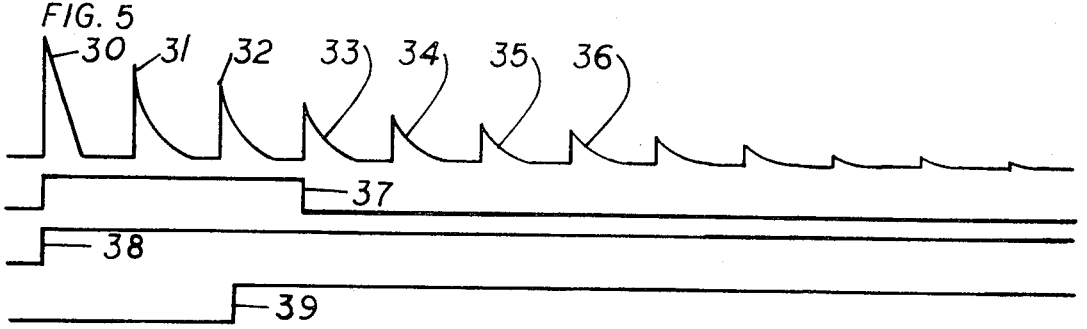

FIG. 5 shows the wave forms under the same conditions as in FIG. 4 but with the delay increased until a change in reading is obtained. In this case, the bistable circuit 20 is not reset until the third back reflection and the output of bistable circuit 20 is now 50 percent longer than before the delay was increased, thus indicating that the first reading was made from the second back reflection.

Thus by manual adjustment of the control 24 and by observing the readings obtained, it is possible to accurately and reliably determine the thickness of a part even when it is quite thin.

Figure 6:
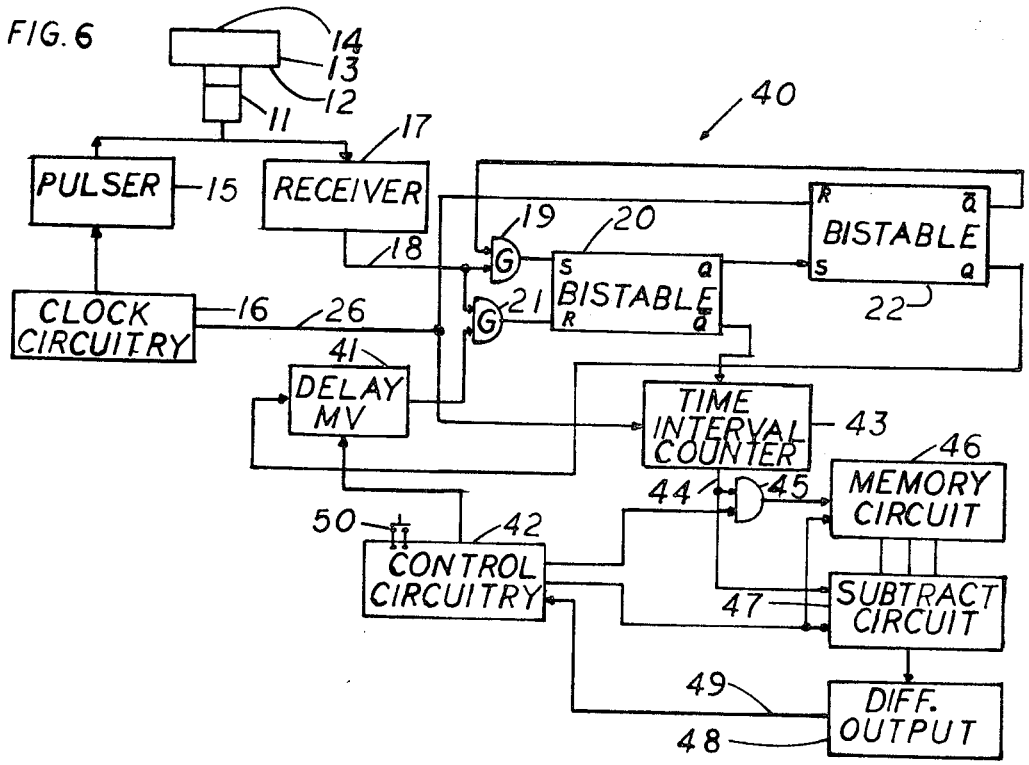
FIG. 6 is a schematic diagram of a modified form of pulse ultrasound thickness measuring system according to the invention.

Referring now to FIG. 6, reference numeral 40 generally designates another preferred form of system according to the principles of the invention, designed for automatic operation without using a manually adjustable control such as the control 24 of the system 10. The system 40 uses some of the same components and circuits as FIG. 1, designated by the same reference numerals. However, a delay multivibrator 41 is substited for the delay multivibrator 23 and adapted to be controlled by a control signal applied from control circuitry 42. In addition, the "Q" output of the bistable circuit 20 is applied to a time interval counter 43 which produces a digital output signal on a line 44, applied through a gate circuit 45 to a memory circuit 46 and also applied to a subtraction circuit 47 coupled to the memory circuit 46. A predetermined difference output of the subtraction circuit 47 is detected by a circuit 48 to apply a control signal to the control circuitry 42. Time interval counter 43 is reset by a signal on line 26 from the clock circuitry 16 and the memory and subtraction circuits 46 and 47 are reset by a signal applied through a line 49. Operation of the control circuitry 42 may be initiated by depressing a pushbutton 50.

In the operation of the system 40 of FIG. 6, the control circuitry 42 initially applies a signal to the delay multivibrator 41 to obtain a minimum delay and the gate 45 is enabled so that signals from the time interval counter 43 are applied both to the memory circuit 46 and the subtraction circuit 47. The pushbutton 50 may then be depressed to initiate operation of the control circuitry 42 which then closes the gate 45, retaining the initial reading in the memory circuit 46. Thereafter, control circuitry 42 applied a signal to the delay multivibrator 41 to gradually increase the delay. As each time interval is measured, it is entered into the subtraction circuit 47 and if it is not significantly different from that registered by the memory circuit 46, nothing happens. However, if the digital signal entered into the subtraction circuit 47 from the counter 43 exceeds the digital signal registered in the memory circuit 46 by a significant amount, a difference output signal is produced by circuit 48 which stops operation of the control circuitry 42. The subtraction circuit 47 then registers a numerical indication proportional to the thickness of a part, regardless of the order of the received signal which resulted in the initial registering in the memory circuit 46. After a certain length of time, they reset signal may be applied through line 49 to the memory and subtraction circuits 46 and 47.

It will be understood that modifications and variations may be effected without departing from the spirit and scope of the novel concepts of this invention.

We claim as our invention:

1. In an ultrasonic thickness measuring system, means for periodically transmitting bursts of ultrasonic energy int one surface of a part, receiver means for developing interface signals corresponding to the transmission of bursts into said one surface, first order received signals in response to first reflections back from the opposite surface and second and higher order recieved signals in response to subsequent reflections back from said opposite surface, circuit means arranged to be triggered in response to signals applied thereto, gate means for applying received signals from said receiver means to said circuit means, time interval measuring means for measuring the time interval from the transmission of a burst into said one surface of the part to the triggering of said circuit means, and a variable delay means for opening said gate means after a progressively increasing delay following the transmission of bursts into the part to determine the order of received signals which are operative to trigger said circuit means and to thereby accurately and reliably determine the thickness of a part, said circuit means comprising a bistable circuit triggered to a set condition in response to an interface signal and to a reset condition in response to a received signal applied through said gate means.

2. In a system as defined in claim 1, said variable delay means comprising a monostable multivibrator, and control means for initiating operation of said monostable multivibrator in response to said interface signal.

3. In a system as defined in claim 1, said measuring means being operative to measure the time duration of the placing of said bistable circuit in said set condition.

4. In a system as defined in claim 1, a second bistable circuit coupled to the first bistable circuit to be triggered to a set condition in response to triggering of said first bistable circuit to said set condition, means for coupling said second bistable circuit to said variable delay means to initiate operation of said variable delay means, and means for resetting said second bistable circuit prior to each transmission of a burst of ultrasonic energy into the part.

5. In a system as defined in claim 4, second gate means for applying said interface signal to said first bistable circuit, and means coupling said second bistable circuit to said second gate means to close said second gate means when said second bistable circuit is in said set condition.

6. In a system as defined in claim 1, said variable delay mean being manually adjustable.

7. In a system as defined in claim 1, control circuit means coupled to said variable delay means for initially obtaining a minimum delay and then gradually increasing the delay of said variable delay means.

8. In a system as defined in claim 7, memory means for registering the value of said time interval with said minimum delay, subtraction means operable during said gradual increase of the delay to register the difference between the value registered by said memory means and the value of said time interval during said progressive increase of the delay.

9. In a system as defined in claim 8, means responsive to the registering of a substantial value by said subtraction means for applying a stop signal to said control circuit means.

* * * * *